United States Patent [19]

Effenberger et al.

[11] Patent Number: 5,098,279
[45] Date of Patent: Mar. 24, 1992

[54] BLOW-MOLDING MACHINE

[75] Inventors: Alfred Effenberger, Filderstadt; Hellmut Mandry, Stuttgart, both of Fed. Rep. of Germany

[73] Assignee: R. Stahl Blasformtechnik GmbH, Leinfelden-Echterdingen, Fed. Rep. of Germany

[21] Appl. No.: 560,765

[22] Filed: Jul. 31, 1990

[30] Foreign Application Priority Data

Aug. 4, 1989 [DE] Fed. Rep. of Germany ....... 3925859

[51] Int. Cl.$^5$ .................................. B29C 49/42
[52] U.S. Cl. .................................. 425/534
[58] Field of Search ............... 425/534, 522, 532, 537

[56] References Cited

U.S. PATENT DOCUMENTS

| | | | |
|---|---|---|---|
| 3,640,661 | 2/1972 | Gasior et al. | 425/534 X |
| 4,004,872 | 1/1977 | Krall et al. | 425/534 X |
| 4,140,468 | 2/1979 | Duga | 425/534 |
| 4,251,203 | 2/1981 | Oas | 425/534 X |
| 4,279,587 | 7/1981 | Martin, Jr. | 425/534 X |
| 4,560,340 | 12/1985 | Younkin et al. | 425/534 X |
| 4,709,803 | 12/1987 | Swiderski | 425/534 X |

Primary Examiner—Richard L. Chiesa
Attorney, Agent, or Firm—Antonelli, Terry, Stout & Kraus

[57] ABSTRACT

A blow-molding machine having two calibrating stations located on both sides of a centrally arranged extrusion station, and including two closing systems, for one set of blow molds each, is equipped with finishing stations arranged along the longitudinal center plane of the blow-molding machine extending at a right angle to the transverse center plane thereof, for performing pinch-off removal, punching and testing operations, for example. The hollow bodies, which have been blown at the calibrating stations, are fed to the first finishing station in alternating succession by a swinging gripper capable of swinging altogether by 180°. The swinging gripper includes a shell closing system arranged for being pivoted about the swinging axis of the swinging gripper and for being displaced radially relative to that axis. In addition, the shell closing system can be rotated by 180°.

10 Claims, 7 Drawing Sheets

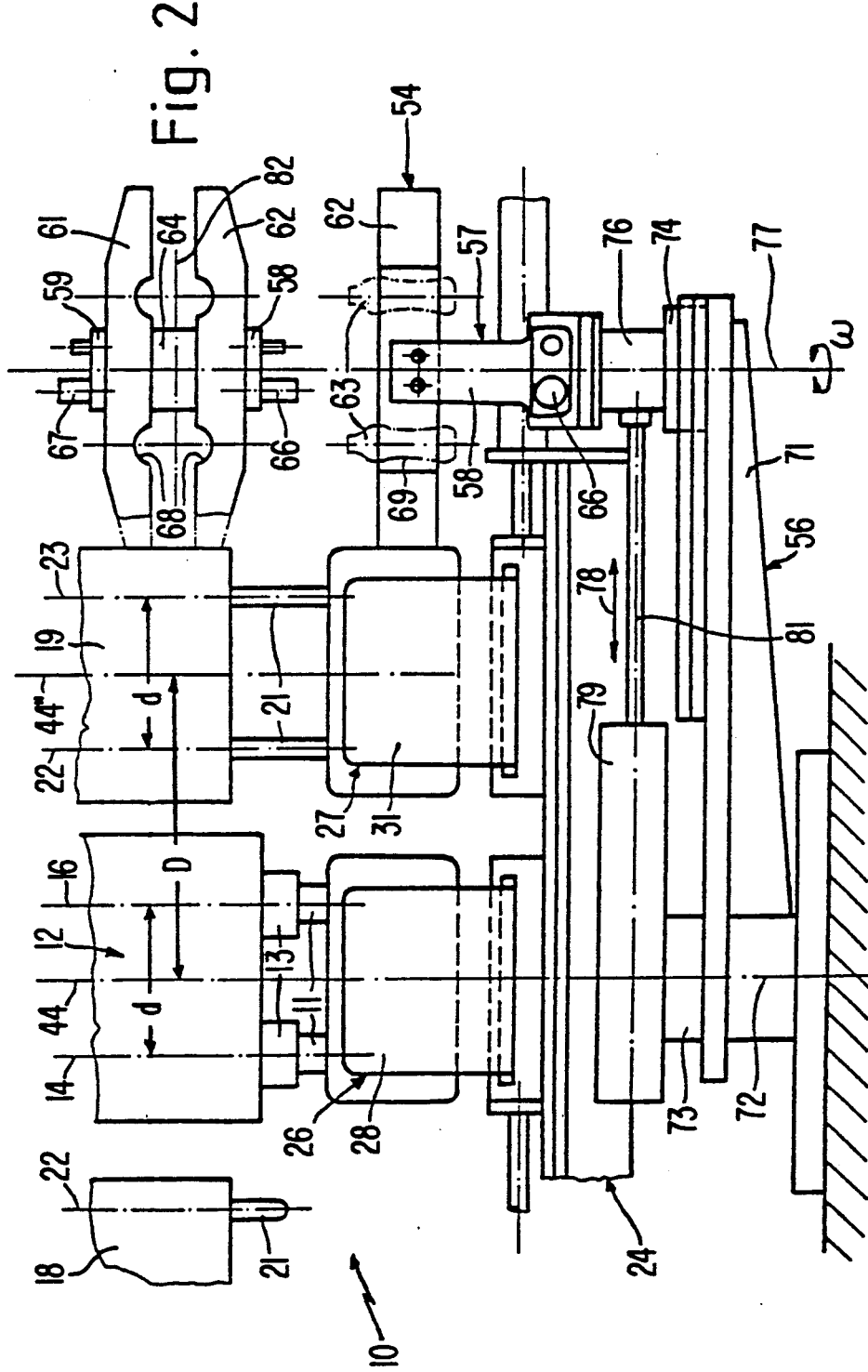

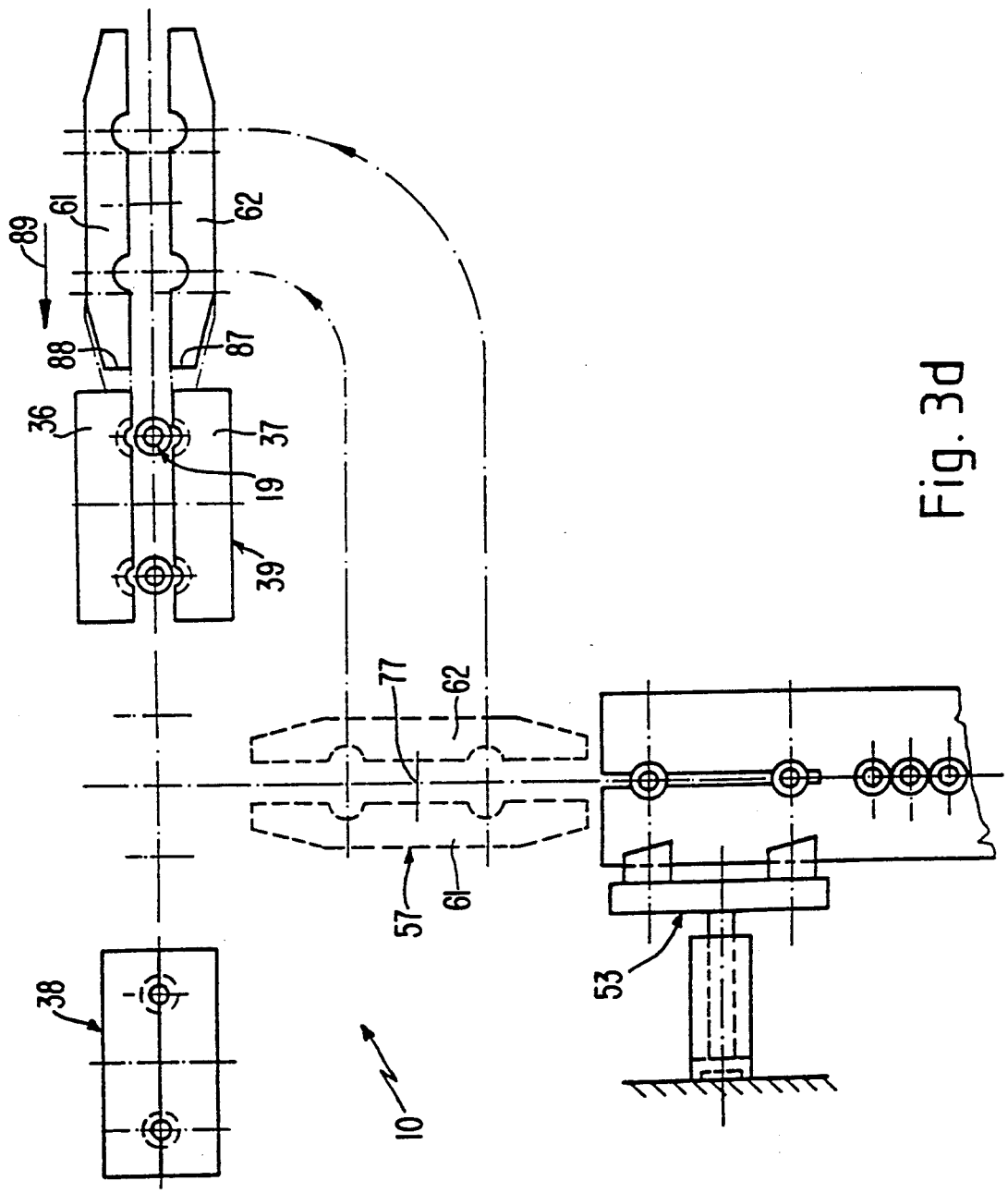

BLOW-MOLDING MACHINE

FIELD OF THE INVENTION

The present invention relates to a blow-molding machine having an extrusion station and two calibrating stations arranged opposite each other, relative to the extrusion station.

BACKGROUND OF THE INVENTION

Blow molding machines comprising an extrusion station and two calibrating stations arranged opposite to each other, relative to the extrusion station have been proposed with such blow-molding machines including two closing systems each intended for one side of blow molds and assigned to one of the calibrating stations, in which plastic hollow bodies are blown in alternating succession at the two calibrating stations. A gripper mechanism is generally provided by which the blown hollow bodies can be transferred to finishing stations arranged along a line in one plane for further processing, with such further processing including, for example, pinch-off removal and/or the cutting or punching operation.

Blow-molding machines of this type have been generally known. Typical manufacturers of such machines are, for example, Bekum, Kautex and Battenfeld-Fischer.

The known blow-molding machines consist of a basic machine comprising an extrusion station and two calibrating stations arranged laterally thereof, as well as closing systems assigned to the calibrating stations and carrying each two mold halves which form the blow mold of the respective closing system and can be loaded alternately with hose-like parisons of a plasticized synthetic material that have been produced at the extrusion station. In addition to these machine elements constituting the basic machine, there are provided finishing stations which are arranged downstream of the two calibrating stations and which are intended, for example, for punching grip recesses, for example into bottles, and/or for removing pinch-off from the hollow bodies emerging from the blow molds and/or for testing the hollow bodies for tightness, with it being understood that in the case of blow-molding machines having two calibrating stations all these finishing stations must be provided twice, in the normal arrangement usual for blow-molding machines having only a single calibrating station.

If the hollow plastic bodies, after having been blow-molded and given their final form in subsequent finishing stations, are to be removed from the system at a single point of discharge, possibly in uniform orientation, expensive transfer and conveying means are additionally required for guiding the hollow bodies, which have been molded at different calibrating stations, to a common delivery station.

Due to the above noted constructional and functional properties, these blow-molding machines at least the following disadvantages.

1. They require much space along the plane(s) marked by the line of finishing stations.

2. They require a great amount of technical input, thus causing high production expenses, due to the double line of finishing stations. This disadvantage is even aggravated by the fact that two sets have to be provided also of the transfer and retainer shells, which have to be adapted to the shape of the hollow bodies produced and which are rather expensive to produce. The same applies analogously for punching tools, which have to be adapted for example to the shape of the grip recesses, and for testing equipment and other finishing tools.

3. They require additional input for the conveying and transfer installations necessary for transporting the finished hollow bodies to a common delivery station.

SUMMARY OF THE INVENTION

The aim underlying the present invention essentially resides in providing a blow-molding machine of the aforementioned type which dispenses with the need to provide for expensive transfer installations for collecting the hollow bodies molded at different calibration stations, which has a generally simplified construction, and which occupies less space.

According to the invention the gripper means comprises a swinging gripper for transferring the hollow bodies, which have been blown at the calibrating station, to a position suitable for further transportation, in the same plane along which the hollow bodies, blown at the other calibrating station, are conveyed to the first finishing station.

By virtue of the above noted features of the present invention, after the point of delivery of the hollow bodies arriving from the two calibrating stations to the first finishing station, the conveying direction is the same for all hollow bodies so that no additional transport or transfer means are required for guiding the hollow bodies to a common delivery station.

The machine now only requires a single set of finishing stations, which leads to a considerable reduction of both, the space required by the blow-molding machine according to the invention, and the technical input needed for its implementation. It is particularly important in this connection that the grippers, the contours of which must conform to those of the parts produced and of which two sets have to be provided in conventional twin calibrating machines in order to take over the hollow bodies from the calibrating mandrels, now have to be provided only once, namely, on the swinging gripper.

The blow-molding machine according to the invention can be implemented in such a way that the finishing stations are arranged along a plane defined by the central axes of the blowing mandrels of the calibrating stations arranged on both sides of the extruder, i.e. in a line extending in the same direction in which the blow molds perform their movements for picking up the extruded hose-like plastic parison and for transferring it to the calibrating stations, with the finishing stations being provided only on "one side" of the basic machine and the swinging gripper performing a 180° movement in order to transfer the hollow bodies, which have been blown at the other calibrating station, to the first finishing station.

According to the blow-molding machine the transfer plane, along which the finishing stations are aligned, coincides with the longitudinal center plane of the blow-molding machine, which extends at a right angle to the transverse center plane of the blow-molding machine as defined by the central axes of the calibrating mandrels, with the result that the hollow bodies from both calibrating stations have to be moved to the position suited for loading them into the first finishing station by a 90° swinging movement. This offers, however, the advantage that the required time period for the swinging movements are the same for the hollow bodies blown at both calibrating stations, or may at least be kept "the same", a condition which has been found to be most favorable for reasons of blowing-machine cycle time minimization.

The required 90° swinging movements between each of the calibrating stations and the first finishing station can be implemented again by a single swinging gripper which is arranged to swing over an angle of 180°, for "collecting" the molded bodies at the two calibrating stations and feeding them to the first finishing station.

According to a further features of the blow-molding machine of the present invention, the swinging gripper of the machine comprises a horizontal arm which can be driven to perform swinging movements and which is equipped, in its longitudinal direction, i.e. in radial direction relative to the swinging axis, with a shell closing system serving as a gripper unit, which can be moved to and fro in the longitudinal direction of the arm by a further drive. The swinging gripper can then be used also for transferring the hollow bodies to the following finishing station, in particular, for transporting the hollow bodies between the typical guide rails, simply by pushing them forward by "radial" movements of the shell closing system. Given the azimuthal swinging movement of the arm and the radial sliding movement of the shell closing system on the arm, the latter may be guided also along elliptical or similar paths which can be run past the closing systems carrying the blow-molds at a safe distance. Consequently, the usual design of the closing systems may be taken over unchanged for the blow-molding machine according the invention.

The constructional design of the swinging gripper can be realized in a particularly advantageous manner if the swinging drive is given the form of a hydraulic swinging cylinder, with a stationary shaft and a housing arranged to rotate about the longitudinal axis of the shaft, and the radial drive is may be fashioned as a pneumatic linear cylinder so that both the housing and the arm can be firmly connected with the housing of the drive motor for the swinging motion. In accordance with still further features of the present invention, the shell closing system of the swinging gripper can rotate by at least 180° about an axis extending in parallel to the swinging axis of the swinging motor, with the drive motor provided for this purpose being preferably constructed as a hydraulic or pneumatic swinging-vane motor with stationary housing and rotary shaft to which the shell closing system is connected in nonrotary relationship. This arrangement enables "asymmetrical" hollow bodies which have been blown at the two calibrating stations in defined orientation, as regards their asymmetrical areas, to be fed to the first finishing station in defined, uniform orientation.

According to the present invention, the opening and sliding movements of the closing system and the gripper shell required for transferring the extruded material into the blow mold of the respective closing system and for picking up the hollow bodies blown in the mold of the same closing system are synchronized. This synchronization is facilitated in a simple manner due to the fact that the shell system can be displaced until it comes to bear against that closing system which is the next to take over the raw material, and can thus be brought into a suitable position for picking up the hollow bodies previously blown in the mold of the same closing system, so that these movements of the closing system can be controlled in a simple manner. It is then possible, for example, to utilize the accuracy of a follower controlled hydraulic drive, which may be provided for effecting the movements of the blow-mold closing systems, also for controlling the movements of the shell closing system.

The swinging gripper and/or the finishing stations may be designed as separate components suited for being attached to a conventional basic machine.

BRIEF DESCRIPTION OF THE DRAWINGS

Other details and features of the invention will become apparent from the following description when read in connection with the accompanying drawings wherein:

FIG. 1 is a schematic view of part of a blow-molding machine according to the invention, with a swinging gripper, as viewed from a finishing end;

FIG. 2 is a schematic top view of the shell system of the swinging gripper illustrated of FIG. 1;

DETAILED DESCRIPTION OF PREFERRED EMBODIMENT

Figure 3A:
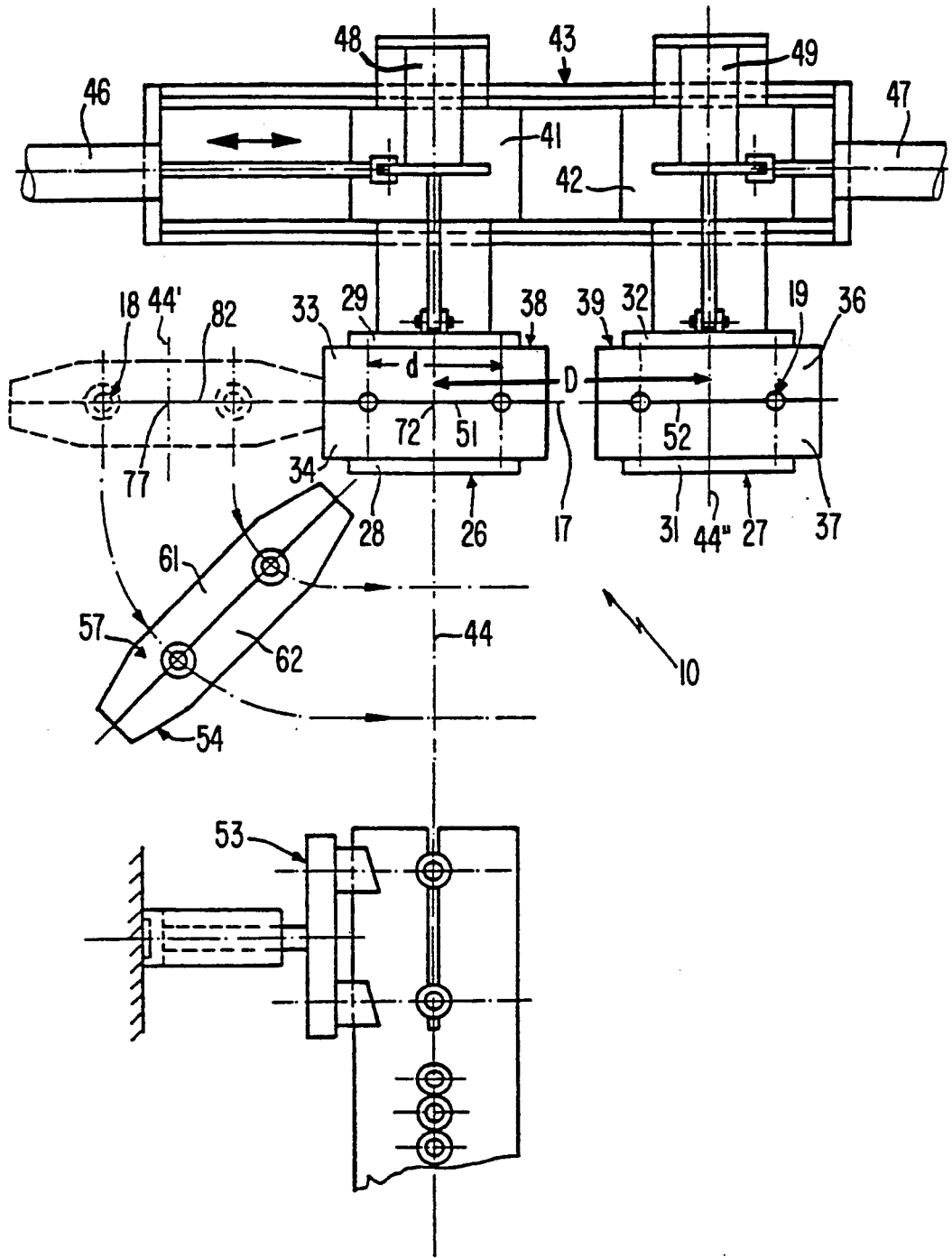
FIG. 3 *a* is a partial top view of the blow-molding machine according to FIG. 1, together with a first finishing station.
FIGS. 3*b*–3*f* are schematic top views of a blow-molding machine constructed in accordance with the present invention respectively illustrating an operating sequence of the machine.

Referring now to the drawings wherein like reference numerals are used throughout the various views to designate like parts and, more particularly, to FIG. 1, according to this figure, a blow-molding machine generally designated by the reference numeral 10, constructed in accordance with the present invention, is adapted to, for example, produce bottle, can or tube-like hollow bodies, including canisters, from conventional thermoplastic materials such as, for example, polyethylene (PE), polypropylene (PP), polyvinyl chloride (PVC), polystyrene (PS) or polyamide (PA) which represent samples of commonly used materials suited for a blow-molding process.

The plastic material to be transformed into the finished product is supplied to the machine in a thermally-plasticized condition, in the form of a hose-like parison 11, from an extruder indicated generally by reference numeral 12 which, in the illustrated embodiment, has two extrusion heads 13 from which the parisons 11 emerge suspended in downward direction and in coaxial arrangement relative to the central axes 14 and 16 of their extrusion heads 13.

Viewed along the vertical transverse center plane 17 FIG. 3 *a*) defined by the two central axes 14 and 16 of the two extrusion heads 13 of the extruder 12, calibrating stations 18 and 19 are arranged on both sides of the extruder 12, each of such calibrating stations being provided with two blow mandrels 21 whose vertical central axes 22 and 23 also extend along the vertical transverse center plane 17 of the extruder 12 or of the blow-molding machine 10, their horizontal spacing d being identical to that of the central axes 14 and 16 of the extrusion heads 13. The extruder 12 is spaced from the two calibrating stations 18 and 19 by the same distance D, measured along the transverse center plane 17, between the longitudinal center plane 44 of the extruder 12 extending at a right angle thereto, and the longitudinal center planes 44' and 44" of the two calibrating stations 18 and 19, which extend in parallel thereto, between the axes 22 and 23 of the blow mandrels.

The extruder 12 and the two calibrating stations 18 and 19 are mounted on a machine frame 24 which also serves as stationary base for two closing systems 26 and 27 arranged to be moved to and fro along the frame 24.

In FIGS. 3a-3f, the calibrating stations 18 and 19 are represented only, for the sake of clarity—by the cross-sections of their blow mandrels 21 and the latter's central axes 22 and 23.

Each of the two closing systems 26 and 27 comprises two jaws 28, 29 and 31, 32, respectively, which can be displaced relative to each other and which carry on their neighboring sides the mold halves 33, 34 and 36, 37, respectively, of two blow molds generally designated by the reference numerals 38 and 39 and in which the molded products are blown at the calibrating stations 18 and 19. As shown in FIG. 3a, the closing systems 26 and 27 are mounted on sliding blocks 41 and 42 arranged in guides indicated generally by 43 incorporated in the machine frame 24, for horizontal reciprocating movement in transverse direction relative to vertical longitudinal center plane 44 extending between the two extrusion heads 13.

Hydraulic drive cylinders provided for effecting these movements of the closing systems 26 and 27 are indicated by reference numerals 46, 47.

The two drive cylinders 46 and 47 control the displacements of the two closing systems 26 and 27 by which the blow molds 38 and 39 are moved to a position below the extruder 12, for taking over the parison 11, and back to the respective calibrating station 18 or 19.

For the purpose of controlling the opening and closing movements of the blow molds 38 and 39, the closing systems 26 and 27 are provided each with one linear hydraulic cylinder 48 or 49, respectively, acting mechanically between the jaws 28, 29, and 31, 32, respectively, of the two closing systems 26 and 27. The relative movements of the jaws 28, 29 and 31, 32 of the two closing systems 26 and 27 achievable through action of these hydraulic cylinders 28 and 29 are "symmetrized" by driving mechanisms (not shown), such as toothed racks and pinions, in such a way that the blow mold halves 33, 34 and 36, 37 of the two blow molds 38 and 39, whose gaps 51 and 52 extend along the vertical transverse center plane 17 of the blow-molding machine 10 in the closed condition of the blow molds 38 and 39, are deflected by equal amounts, relative to the the transverse center plane 17, in both the opening and the closing directions.

The two closing systems 26 and 27 are designed as self-supporting systems arranged to project laterally beyond the guiding means 43 of the machine frame 24, as shown most clearly in FIG. 3a, so that sufficient space remains "below" the closing systems for drive elements of a gripper system by which the hollow bodies blown at the calibrating stations 18 and 19 can be transferred to subsequent finishing stations.

The structure of the blow-molding machine 10 described heretofore may be regarded as conforming to the state of the prior art.

However, whereas in the case of the known blow-molding machine using two alternately loaded calibrating stations, each of the latter must be followed by a complete set of finishing stations, which means that each of these stations must be provided twice, the blow-molding machine 10 as illustrated in FIGS. 3a to 3f uses only one set of finishing stations which, for the sake of clarity, is represented in the drawings only by a first finishing station 53 which, in the illustrated embodiment, takes the form of a pinch-off removal station.

It can be noted that this station, as well as other finishing stations not specifically shown in the drawing, are arranged along the vertical longitudinal center plane 44 of the blow-molding machine 10 and that each of the stations is provided only once.

Charging of the finishing station 53 is effected by a swinging gripper 54. While the structure of this gripper can be seen best in FIGS. 1 and 2, different operational positions can be seen in FIGS. 3a to 3f. The swinging gripper serves for feeding hollow bodies, which have been blown alternately at the two calibrating stations 18 and 19, in equally alternating succession to the first finishing station, here the pinch-off removal station 53.

The swinging gripper 54 comprises a swinging mechanism indicated generally at 56, as well as a closing system 53, of a design analogous to that of the closing systems 26 and 27 for the blow molds 38 and 39 with jaws 58 and 59 which can be moved toward and away from each other and on which shells (halves) 61 and 62 can be mounted in detachable relationship, similar to the blow-mold halves 33, 34 and 36, 37 of the closing systems 26 and 27. In the open condition of the closing system 57 illustrated in the top view of FIG. 2, these shells can be moved to positions underneath the neighboring calibrating stations 19 and 18, respectively, while in the closed condition they engage the hollow bodies 63, which hang down from the blow mandrels 21 of the respective calibration station 19 or 18 when the respective blow mold 29 or 38 has been opened, in a form- locking manner, thus holding these hollow bodies 63, for a certain time, so that the blow mandrels 21 can be withdrawn from the hollow bodies 63 whereafter the swinging gripper 54 will transport the hollow bodies 63 to the pinch-off removal station 53.

The two jaws 58 and 59 of the shell closing system 57 can be displaced along a block-shaped base 64. The closing drives include two pneumatic linear cylinders 66 and 67 acting each on one of the two closing jaws 58 and 59. The cylinders 66 and 67 must develop only moderate closing forces, and both the opening and the closing movements of the jaws 58 and 59 and of their shells 62 and 61 are limited by stops (not shown) fixed to the base.

The shape of the grip areas 68 of the shells 61 and 62, which in the drawing is represented as a semi-circular contour, corresponds conveniently to a narrower portion indicated diagrammatically at 69 of the hollow bodies 63 to be produced by the blow-molding machine 10 so that the hollow bodies are positively fixed in the closed condition of the shell system.

The swinging device 56, by which the transfer and feeding movements of the swinging gripper 54 can be controlled, comprises a horizontal arm 71 which carries the shell closing system 57 and which can be pivoted about the axis 52 defined by the line of intersection of the vertical transverse center plane 17 and the vertical longitudinal center plane 44 of the blow-molding machine 10.

The function of the drive motor is performed by a hydraulic swinging motor 63 with stationary shaft (not shown) and a rotating housing on which the horizontal arm 71 is mounted in the way that can be seen best in FIG. 1.

The arm 71 carries a mounting block 74 which can be displaced thereon in both senses in the longitudinal direction of the arm, i.e. in radial direction relative to the swinging axis 72 of the hydraulic motor 73. The mounting block carries a second swinging motor 76 by which the closing system 57 of the two shells 61 and 62 can be rotated about the axis 77 extending in parallel to the swinging axis 72 of the swinging motor 73.

This second swinging motor 76 is designed as hydraulic swinging-vane motor whose housing is fixed to the mounting block 74, while the base 64 of the shell closing system 57 is fixed to its vane shaft in non-rotating relationship.

The radial drive, by which the shell closing system 57 of the swinging gripper 54 can be moved to and fro along the arm, in the direction indicated by the double arrow 75, consists of a pneumatic linear cylinder 79 whose housing is fixed, in non-rotary relationship, to the rotary housing of the drive motor 73 generating the pivoting movement, while its piston rod 81 is fixed against displacement to the housing of the swinging-vane motor 76.

The swinging angle Φ of the arm 71, which can be pivoted by the swinging motor 73, and the rotary angle ω of the shell closing system 57, which can be rotated by the second swinging motor 76, with amount to 180° each, the angular end positions of the arm 71 being those in which the rotary axis 77 of the shell closing system 57 coincides with the vertical transverse center plane 17 of the blow-molding machine 10 beside the one calibrating station 18 or the other calibrating station 19, and the alternative rotary end positions of the closing system 57 being those in which its vertical longitudinal center plane 82 extending between the two shells 61 and 62 is parallel or "antiparallel" to the vertical longitudinal center plane of the swinging gripper 54 defined by the swinging axis 72 and the rotary axis 77 of the swinging mechanism 56.

The capability of the shell closing system 57 to rotate about the rotary axis 77 is necessary in order to enable hollow bodies 63 having a shape differing from a rotationally symmetrical form, such as bottles with a grip portion provided on one side, which are blown at the calibrating stations 18 and 19 with their grip portions all having the same orientation, i.e. pointing toward the transverse center plane 17 of the blow-molding machine 10, to be transferred to the finishing stations in the same oriented condition so that the finishing process, i.e. in particular one to be carried out in the described grip area, can be performed "at the correct point".

Hereafter, a typical operating cycle of the blow-molding machine 10 will be described by way of example by reference to FIG. 3a and the additional, largely simplified FIGS. 3b to 3f.

In the starting condition illustrated in FIG. 3a, the closing system 26 of the "left" calibrating station 18, as viewed in FIG. 1, occupies its take-over position below the extruder 12. The transfer of the two plastic parisons 11 to the blow mold 38 has already been completed, as is evidenced by the closed position of the mold. The right closing system 27, as represented in this figure occupies its position at the right calibrating station 19 where the blowing process is going on in this situation.

The swinging gripper 54, which is illustrated in FIGS. 3a to 3f only by the two shells 61 and 62, is performing its swinging movement from the left calibrating station 18 to the first finishing station 53. The radial drive cylinder 79 has already reached its "retracted" operating position, i.e. the position in which the minimum distance exists between the rotary axis 77 of the shell closing system 57 and the swinging axis 72 of the swinging device 54, after it had been "extended" a small distance to increase this spacing between the axes in order to enable the shell closing system 57 to be moved past the blow mold 38 in the subsequent first phase of its swinging movement.

Figure 3B:
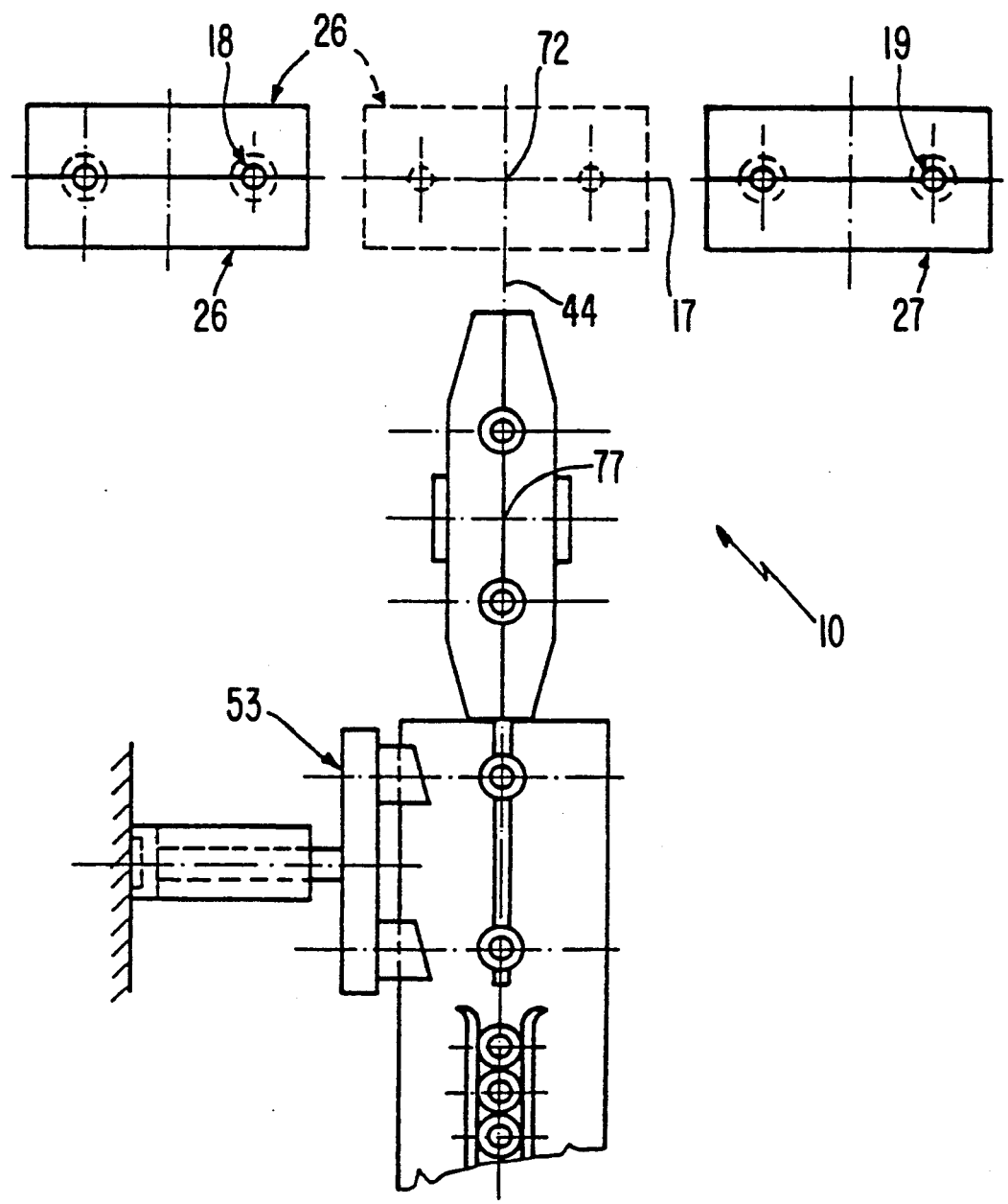

In the resulting situation illustrated in FIG. 3b, the swinging gripper 54 has completed its movement from the vertical transfer center plane 17 to the vertical longitudinal center plane 44 of the blow-molding machine 10, while being still in the position corresponding to the minimum spacing of its rotary axis 77 from the swinging axis 72. The left closing system 26 which may still have occupied its position below the extruder 12, indicated by dashed lines, when the swinging gripper reached its illustrated position, has now been moved to its position at the left calibrating station 18 where the blowing process has already started. The right closing system 27 still occupies its position at the calibrating station 19 where the blowing process is still continuing.

Figure 3C:
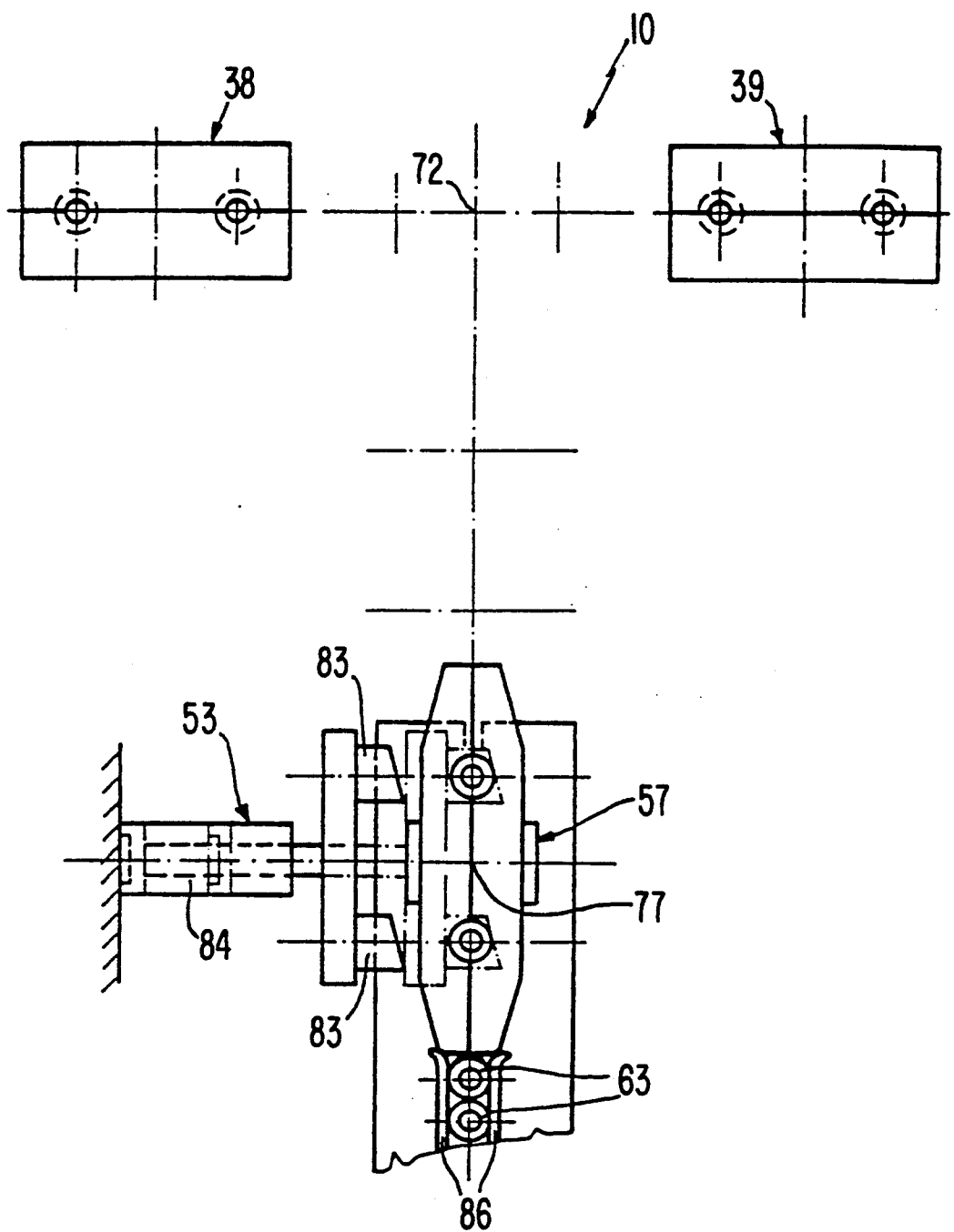

Once the shell closing system 57 has reached its position illustrated in FIG. 3b, it is moved by the linear cylinder 79, which acts as radial drive, into the position illustrated in FIG. 3c, i.e. the correct position for being processed in the pinch-off removal station 53 and in which any pinch-off excess material present at the top existing on the hollow bodies retained between the two shells 61 and 62 is removed by two cutting tools 83. The cutting and return movements of the cutters 83 are controlled in the illustrated particular embodiment by a pneumatic linear cylinder 84 fixed to the frame of the finishing station 53.

The feeding movements of the shell closing system 57 to the processing position at the pinch-off removal station 53 of the other shell closing system and/or the feeding movements of another shell closing system (not shown) between the pinch-off removal station 53 and other finishing stations (not shown) may also be utilized, as indicated diagrammatically in FIG. 3c for transporting the processed hollow bodies 63 between guide rails 86 to a discharging device of the blow-molding machine 10.

Upon completion of the processing operation at the pinch-off removal station 53, the radial drive cylinder 79 is retracted, thereby returning the shell closing system 57, in open condition, into the position indicated by dashed lines in FIG. 3d. Thereafter, the shell closing system 57 is rotated by further 90°, as illustrated in FIG. 3d, while the radial drive cylinder 79 is actuated simultaneously to increase the distance between the rotary axis 77 of the shell closing system 57 and the swinging axis 72 of the swinging mechanism 76. As a result of these actions, the shell closing system 57 is moved into a position in which it is initially spaced a small lateral distance from the blow mold 39 and its closing system, which are still positioned at the right calibrating station 19.

Here at the latest, conveniently however during the swinging movement, the shell closing system 57 is rotated by 180° about its rotary axis 77, by actuation of the swinging-vane motor 76, so that it assumes an orientation relative to the right calibrating station 19 identical to its former orientation relative to the left calibrating station 18, i.e. the position in which the end faces 87 and 88 of the shells 61 and 62, which were facing away from the left calibrating station 18 when the shell closing system 57 occupied its position at that station, are now facing the right calibrating station 19.

The position near the right calibrating station 19, which has been assumed due to the rotary and swinging movements of the shell closing system 57, is illustrated in full lines in FIG. 3d. The shell closing system 57 is still positioned at a small lateral distance from the blow-mold halves 36 and 37 of the right blow mold 39.

Figure 3E:
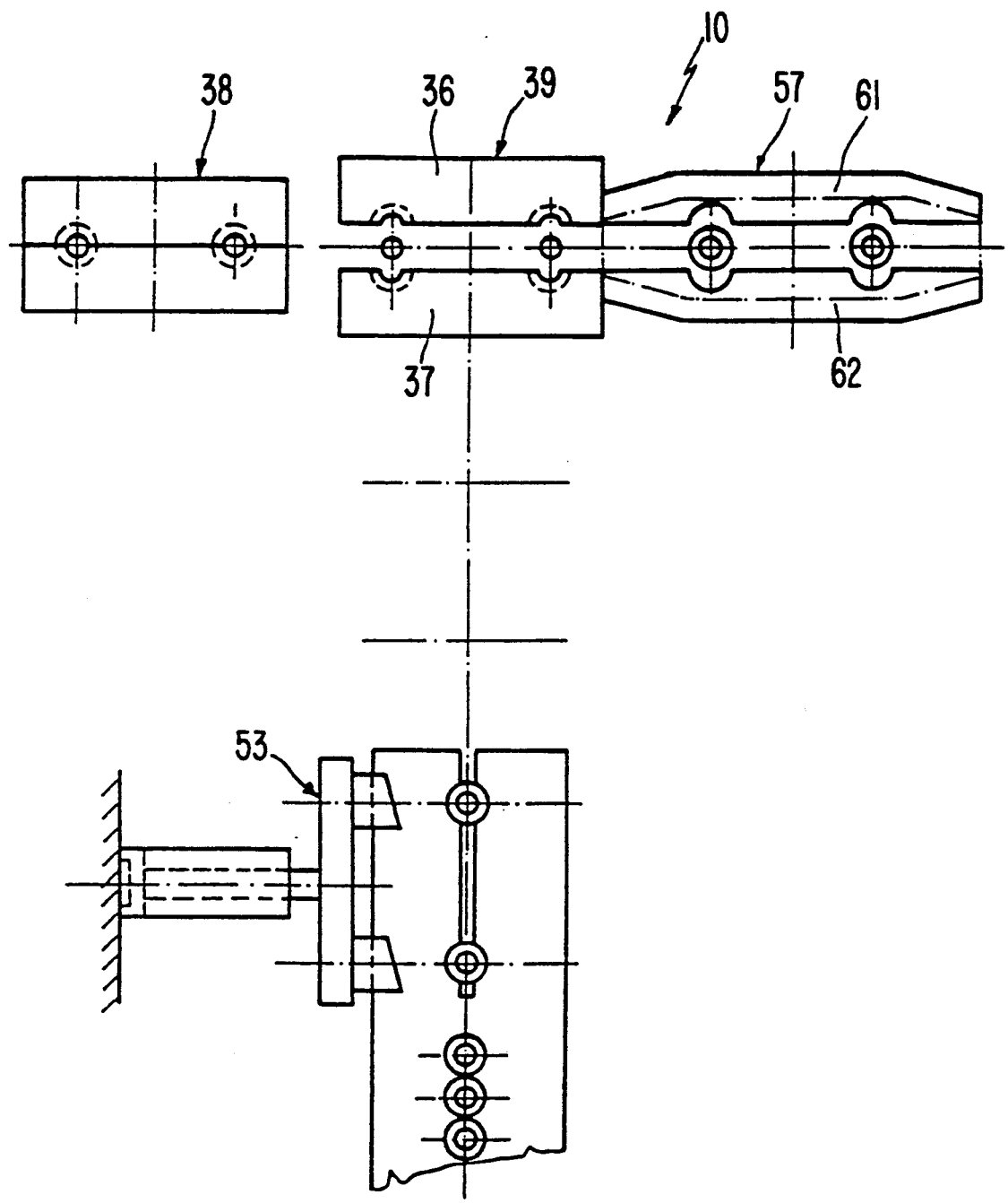
Figure 3F:
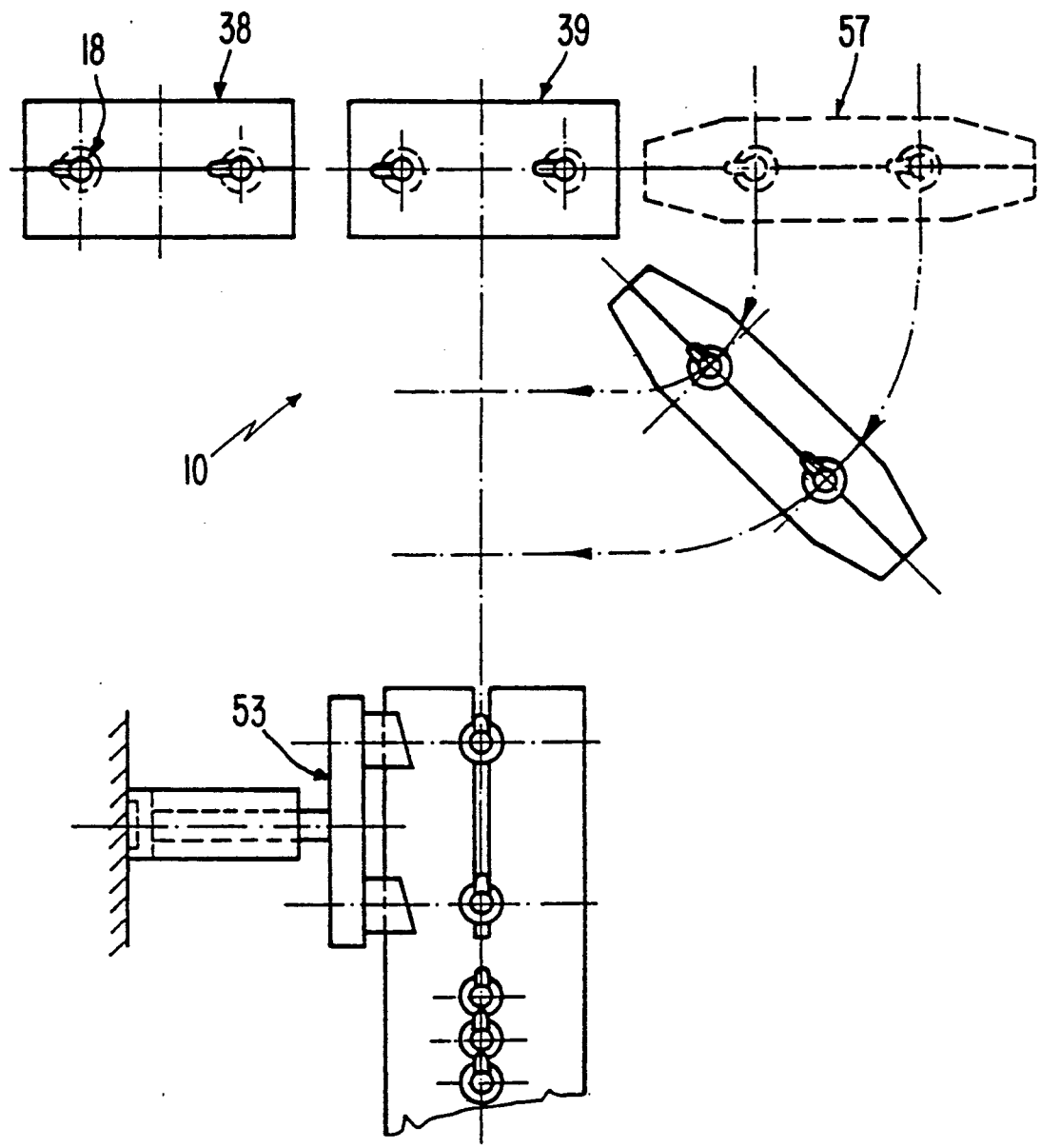

Upon completion of the blowing process at the right calibrating station 19, the blow mold 39 is opened and the radial drive cylinder 79 is actuated to move the shell closing system 57 in the direction indicated by arrow 89, until the end faces 89 and 88 of its shell halves 61 and 62 come to bear against the mold halves 37 and 36. This position of the shell closing system 57 is indicated by dash-dotted lines in FIG. 3d. Thereafter, the blow mold 39 and the shell closing system 57, both in an open condition, are moved jointly into their positions suitable for taking over either the parisons 11 at the extrusion station 12 or the hollow bodies 63 at the right calibrating station 19, the movement of the blow mold 39 being effected by the hydraulic cylinder 47 and the movement of the shell closing system 57 resulting from the fact that is constantly pushed against the blow mold 39 by the pneumatic drive cylinder 79 of the swinging gripper 56. This kind of motion control ensures in a very simple manner the desired "synchronization" of the movements of the blow mold 39 and the shell closing system 57 until they reach the described operational positions. The positions which the blow mold 39, still open, and the shell closing system 57, likewise still open, occupy at the end of this displacement are illustrated in FIG. 3e.

The blow mold 39 and the shell closing system 57 are then closed simultaneously. Thereafter, the shell closing system 57 is returned to its position in which it is spaced a short distance from the blow mold 39, indicated by dashed lines in FIG. 3f, by actuating the pneumatic radial drive cylinder 79 in the "opposite" sense, and turned, by a 90° swinging movement of the swinging gripper 96, into the starting position suitable for transferring the blown hollow bodies 63 to the pinch-off station 53, indicated in FIG. 3b, while the blow mold 39 still occupies its position at the extruder 12, for taking over the parisons 13.

Once the transfer of the hollow bodies 63 to the pinch-off removal station 53 has been completed, the shell closing system 57 is returned, by a 90° swinging movement, to its position beside the left calibrating station 18.

While this swinging movement is still being performed, the shell closing system 57 is already rotated by 180°, by actuation of the swinging-vane motor 76, in order to restore it to the same orientation relative to the hollow bodies blown at the left calibrating station 18 which it had at the beginning of the operating cycle just described by way of example, whereafter it is ready for the next operating cycle to begin.

We claim:

1. A blow-molding machine comprising:
   an extrusion station;
   two calibrating stations in which hollow bodies are blown in alternating succession, said calibrating stations being arranged opposite to each other relative to said extrusion station;
   two closing systems for respectively accommodating one set of blow molds, said closing system being respectively associated with the calibrating stations;
   gripper means for gripping the blown hollow bodies, said gripper means including a pair of jaws movable toward and away from each other and shell means detachably mounted on said jaws for engaging the respective blown hollow bodies; and
   swinging means for swinging said gripper means so as to enable a transferring of the blown hollow bodies from one of said calibrating stations to a transfer starting position in a transfer plane along which the blown hollow bodies, which have of the other calibrating station are transferred to a first of a plurality of finishing stations arranged along a line in one plane for further processing the blown hollow bodies, said swinging means including a horizontal arm means pivotally mounted about a vertical axis for moving said shell means to positions beneath said calibrating stations, said horizontal arm means having mounted thereon a means for moving said jaws toward and away from each other, and wherein said shell means grip said blown hollow bodies in a form-locking manner during a transfer of the blown hollow bodies to the finishing stations.

2. A blow-molding machine according to claim 1, wherein the transfer plane coincides with a longitudinal center plane of the blow-molding machine extending at a right angle to a transverse center plane.

3. A blow-molding machine according to one of claims 1 or 2, wherein said swinging means is pivotable by 180° about said vertical axis to collect said blown hollow bodies to transfer said blown hollow bodies from said two calibrating stations to the first finishing station.

4. A blow-molding machine according to one of the claims 1 or 2, wherein said swinging means includes drive means for pivotally driving said horizontal arm means about said vertical axis, and wherein means for opening and closing said jaws includes a radial drive for moving said means for opening and closing to and fro along a longitudinal direction of said horizontal arm means.

5. A blow-molding machine according to claim 4, wherein said swinging drive means includes one of a hydraulic or pneumatic drive having a fixed shaft and a housing arranged for rotation about a center axis of the fixed shaft, and wherein said radial drive includes a pneumatic linear cylinder.

6. A blow-molding machine according to claim 5, wherein said means for opening and closing includes a separate rotary drive motor for rotating said means for opening and closing by at least 180° about an axis extending in parallel to a pivot axis of said swinging drive means.

7. A blow-molding machine according to claim 6, wherein said rotary drive motor includes one of a hydraulic or pneumatic swinging-vane motor with a fixed housing and a rotating shaft.

8. A blow-molding machine according to claim 7, wherein opening and closing movements of said means for opening and closing intended for transferring the extruded material (11) to the blow mold of the respective closing system (26 or 27) and transferring movements of said blown hollow bodies are effected in synchronism.

9. A blow-molding machine according to claim 8, wherein said means for opening and closing is moved, together with the closing system which is the next to take over a parison, into the position for taking over the hollow bodies previously blown in a mold of said closing system.

10. A blow-molding machine according to one of claims 1 or 2, wherein at least one of said gripper means and the finishing stations are attached to said blow-molding machine.

* * * * *